US011630550B2

(12) United States Patent
Faist et al.

(10) Patent No.: US 11,630,550 B2
(45) Date of Patent: Apr. 18, 2023

(54) METHOD FOR ASSIGNING GRAPHICAL ELEMENTS OF AN OPERATING PROGRAM FOR FIELD DEVICES

(71) Applicant: VEGA GRIESHABER KG, Wolfach (DE)

(72) Inventors: Fridolin Faist, Oberwolfach (DE); Stefan Spengler, Lahr (DE); Arnaud Fritsch, Strasbourg (FR)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 17/477,289

(22) Filed: Sep. 16, 2021

(65) Prior Publication Data

US 2022/0083202 A1  Mar. 17, 2022

(30) Foreign Application Priority Data

Sep. 16, 2020  (DE) .................. 10 2020 124 130.5

(51) Int. Cl.
*G06F 3/048* (2013.01)
*G06F 3/04817* (2022.01)
*G06F 40/109* (2020.01)

(52) U.S. Cl.
CPC ........ *G06F 3/04817* (2013.01); *G06F 40/109* (2020.01)

(58) Field of Classification Search
CPC .................... G06F 3/04817; G06F 40/109
See application file for complete search history.

(56) References Cited

U.S. PATENT DOCUMENTS

| | | | |
|---|---|---|---|
| 9,626,080 B1* | 4/2017 | Labaj | G06F 3/00 |
| 2011/0126142 A1* | 5/2011 | Zhou | G05B 19/4183 |
| | | | 715/771 |
| 2013/0086646 A1 | 4/2013 | Poschmann et al. | |
| 2016/0266882 A1* | 9/2016 | Trevathan | G06F 8/71 |
| 2017/0262263 A1* | 9/2017 | Zinn | G06F 8/60 |
| 2020/0287895 A1* | 9/2020 | Hottgenroth | H04L 63/083 |

FOREIGN PATENT DOCUMENTS

| | | |
|---|---|---|
| DE | 10 2011 083 984 A1 | 4/2013 |
| DE | 10 2019 106 049 A1 | 9/2020 |
| EP | 3 217 236 B1 | 9/2019 |

OTHER PUBLICATIONS

Office Action dated Apr. 13, 2021 in corresponding Germany Patent Application No. 10 2020 124 130.5, 8 pages.

* cited by examiner

*Primary Examiner* — Claudia Dragoescu
(74) *Attorney, Agent, or Firm* — Oblon, McClelland, Maier & Neustadt, L.L.P.

(57) ABSTRACT

A method for assigning a generic property of a graphical element of an operating program or a field device to at least one property of a corporate identity, CI property. The operating program can be used in particular for field devices and other measuring devices, e.g. for level measurement, topology determination and/or for other purposes. The method has the following steps: creating at least one graphical element of the operating program, the graphical element having at least one generic property; and calling the operating program, wherein the at least one generic property of the graphical element is assigned to a CI property.

17 Claims, 3 Drawing Sheets

METHOD FOR ASSIGNING GRAPHICAL ELEMENTS OF AN OPERATING PROGRAM FOR FIELD DEVICES

CROSS-REFERENCE TO RELATED APPLICATIONS

This application claims the benefit of the filing date of the German Patent Application No. 10 2020 124 130.5 filed on 16 Sep. 2020, the entire content of which is incorporated herein by reference.

TECHNICAL FIELD

Described is an operating program, in particular for field devices and other measuring devices for level measurement, topology determination, for limit level determination, and other purposes. Furthermore, the description relates to a field device, a program element, a computer-readable medium, and a use.

BACKGROUND

Field instruments and other measuring devices are used for level measurement, topology determination, limit level determination and other purposes. In many cases, these instruments are operated by means of an operating program. Many operating programs have a graphical user interface. At least some user interfaces are designed according to corporate identity (CI) guidelines, e.g. in order to give a user of the operating program an association with the measuring instrument. In some cases, measuring instruments may be manufactured for several third-party companies. In these cases, adapting an operating program to the guidelines of the corporate identity of each third-party company can be time-consuming and error-prone.

SUMMARY

It is a task of the embodiments to simplify an adaptation of an operating program to guidelines of a corporate identity.

This task is solved by the subject-matter of the independent patent claims. Further embodiments result from the subclaims and the following description.
CGS:THU One aspect relates to a method for associating a generic property of a graphical element of an operator program for a field device with at least one corporate identity (CI) property. The method comprises the steps of:
creating at least one graphical element of the operator program, the graphical element having at least one generic property; and
Calling the operator program, where the at least one generic property of the graphical element is assigned to a CI property.

The operating program can be set up to operate a field device and other measuring devices, for example to start a measurement, to display measured values, to query the status of the field device, to parameterize the field device and/or other elements of the operation of the field device. The field device or measuring device can be used, for example, for level measurement, for limit level determination, for flow measurement, for pressure measurement and/or or for temperature measurement.

The operating program can, for example, run on a mobile device—such as a smartphone, tablet, laptop, etc.—but also on a PC and/or server, e.g. in a control room. The operating program can be designed as a so-called "app". The graphical element of the operating program can be, for example, an icon, for example for "on/off", "stop", "measurement running", "start diagnosis", or an icon for a controller, a radio button, a control panel—("yes/no"), etc. The graphical element can also be a graphic, e.g. a company logo, a specific font and/or a combination of the above and other elements. The graphical element may be a plurality of graphical elements used, for example, in different steps of the operating program. Accordingly, the generic property of the graphical element may be, for example, "company logo", "color 1", "color 2", "font type 1", etc. For example, the corresponding CI properties for a first company may be "Company logo=VEGA", "Color 1=yellow", "Color 2=anthracite", "Font type 1=Helvetika95, 14 point, anthracite", "Sound 1", etc. For a second company, the CI property can be "Color 1=orange" and for a third company, the CI property can be "Color 1=light blue". Parts of the graphic element can be invariant to a CI property; for example, a frame of a symbol "Tank" can always be black, while the representation of the fill level can have the CI property "Color 1".

The creation of the at least one graphical element thus has a kind of "semantic blank" for the generic property. This "semantic blank" is only "filled" when the operating program is called. In the "Tank" example above, there is, for example, a color "(always) black" and a color "Color 1", which is assigned to "Color 1=yellow" when the operating program is called. The information for the assignment can be stored e.g. on the device on which the operating program runs. Alternatively, the information for the assignment may be stored on one or more other devices. For example, the operating program may run on a tablet, and the information may be stored—at least in part—on the field device. For example, one embodiment illustrating this may be as follows: On an app icon of the tablet it says, in anthracite letters on a yellow field "VEGAPULS 69, instrument #3". When the app is called up, a connection is established with VEGAPULS 69 instrument #3. This field instrument has saved a file "CI properties VEGA". The establishment of the connection can include an authentication. Parts of the file "CI properties VEGA" can contain specific properties of "instrument #3", e.g. a picture of its type plate. The "CI Properties VEGA" file is transmitted to the tablet and the at least one generic property of the graphical element is assigned to a CI property. This can also be used for a—implicit and/or explicit—feedback to the user "—successful pairing with device #3". An implicit feedback can be visible e.g. on visual CI properties, e.g. on a yellow frame. An explicit feedback can be e.g. a message "device #3 paired" and/or a sound.

This procedure not only simplifies an adaptation of an operating program to guidelines of a corporate identity (CI). In this way, time and costs can be saved. Furthermore, when a field device is sold by a third-party supplier, the buyer and/or user of the field device will be given a consistent feeling when operating it. In addition, the user of the operating program can be given the feeling of "everything in order" or—in the event of a problem—e.g. "error during coupling" in an intuitive manner.

In some embodiments, the method comprises a further step:
Using the operator program, where the at least one generic property of the graphical element is replaced by the CI property.

For example, the assignment can take place only once or only a few times, e.g. when the program is called up for the first time, during important updates, or during configuration at the manufacturer's or at the third-party supplier's site. This can be particularly advantageous if, for example, the radio communication—e.g. between tablet and field device—is to take place as rarely as possible.

In some embodiments, the CI property is assigned using a file on the field device. The file may be organized, for example, as a single file or as a library. For example, the file may use files such as CSS (Cascading Style Sheets), XML (Extensible Markup Language), and/or some form of manufacturer code in the mapping. The file may be stored, for example, at the manufacturer's facility, or at the third-party vendor's facility during final inspection—as a third-party identifier—in the field device. In this case, the assignment or replacement can take place, for example, when the file is imported and/or later, for example, during the establishment of the connection with the operating device. In this way, the third-party vendor can advantageously deliver a consistent "device and operating program" package.

In some embodiments, the CI property is assigned using a file on a server and/or using a file on a mobile device. This can be done alternatively or in addition to the assignment on the field device. This may, for example, support authentication mechanisms and/or provide greater flexibility in operation.

In some embodiments, the CI property is associated from a combination of the file on the field device and the file on the server and/or the mobile device. This may contribute to an improved access mechanism to the field device, its data, and/or data transmission.

In one embodiment, the CI property is assigned by means of authorized access to the field device, the server and/or the mobile device. This can further improve security, e.g. with regard to the measurement data.

In some embodiments, the CI property includes one or more colors, one or more graphics, and/or one or more sounds. For example, the colors may represent the colors used for external and/or internal representation of the company. Alternatively or additionally, the colors may be customized for specific messages, predefined lighting conditions, etc. For example, an adapted color palette can be assigned for operation at night. Further alternatively or additionally, graphics such as a company emblem, a start and/or end screen, an app icon and/or one or more sounds can be assigned. Thus, a wide range of CI properties can be supported.

In some embodiments, the CI property is designed to be variable. For example, it can be used to enable switching from "Dark Mode" to "Light Mode", e.g. depending on the time of day and/or ambient brightness. Furthermore, it can be used to display values, e.g. measured values, for example a stylized "100%". Furthermore, this can be used to graphically display a fill level, remaining energy of a battery and/or other important values. In one embodiment, this can be applied to the display of the app, so that (for example) the fill level can also be displayed when the app is not open.

In some embodiments, the CI property is stored as a property of a font. For example, the font may be implemented as a TrueType font (file extension .ttf) or an Open-Type font (file extension .otf). A particular advantage of storing graphics and/or fonts as a font is that their variations—e.g. in color, size, thickness, etc.—can be made by an operating system of the operating program. Such variations can be particularly "intuitive" because they may be known to any user of a writing program. By saving as a font, not only is a wide range of "standard variations" of each character (which is understood by the operating system to be a letter) possible, but saving the font requires particularly little memory.

In some embodiments, the method comprises a further step:

Generate an operator program based on a generic operator program using at least one CI property.

Thus, alternatively or in addition to the assignment of the CI property to the graphical element, an operating program or app can also be generated whose appearance can be changed depending on the field device. Also, the app can also be generated based on and/or an assignment to a number, e.g., a serial number or the device number in the field. This allows, for example, different field devices to be operated with different apps, which can advantageously be used, for example, for individual parameterization.

One aspect relates to a field device arranged to map a generic property of a graphical element to a CI property. This may be performed, for example, based on a file on a mobile device, a server, etc., or on the field device itself. The field device may be arranged to transmit the at least one CI property. The field device may be arranged to perform a procedure as described above and/or below.

One aspect relates to a use of a field device as described above and/or below for level measurement, for topology determination, for level limit determination, for flow measurement, for pressure measurement, for temperature measurement, and/or as a display and operating device.

One aspect relates to a program element that, when executed on a processing unit of a field device, a server, and/or a mobile device, instructs the processing unit to perform the method as described above and/or below.

One aspect relates to a computer-readable medium on which the program element described herein is stored.

It should also be noted that the various embodiments can be combined with each other.

For further clarification, the disclosure is described with reference to embodiments illustrated in the figures. These embodiments are to be understood only as examples and not as limitations.

DETAILED DESCRIPTION OF EXEMPLARY EMBODIMENTS

Figure 1:
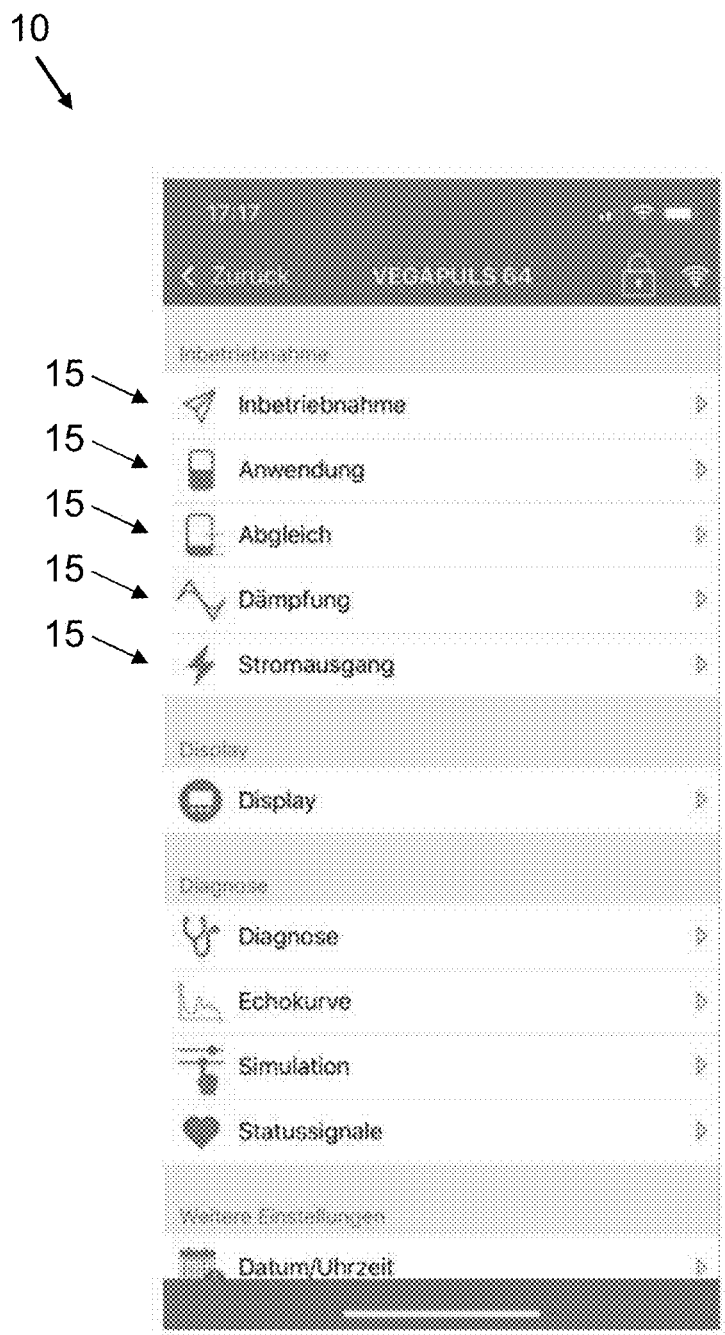
FIG. 1 schematically shows a user program interface according to one embodiment.

FIG. 1 schematically shows an interface of an operating program 10 according to one embodiment. The operating program or app 10 has several graphical elements 15, which can contribute to easy operation of a field device (not shown). The examples of the graphical elements 15 shown relate to, for example, a commissioning, an application, an adjustment, the setting of an attenuation, etc., of a field device. A specially generated font may be used as the source for the graphical elements 15, for example, for the symbols shown at the beginning of the line. This can make the modification of these symbols (e.g., in color, size, thickness, etc.) particularly easy because they can be made, for example, by an operating system of the operator program. Furthermore, saving the font requires less memory than, for example, saving individual graphic symbols.

For example, the operator program 10 may be executable on a field device, a mobile device, a server, and/or another device having a processing unit. The illustrated examples show one type of display after an assignment to a CI property has taken place. The mapping shown concerns CI properties such as "color 1=light gray", "language=German", "font 1=Arial, 8 point, black". Before the assignment or in case of an error in the assignment, the CI properties can assume a default value, e.g. "Color 1=black", etc.

Figure 2:
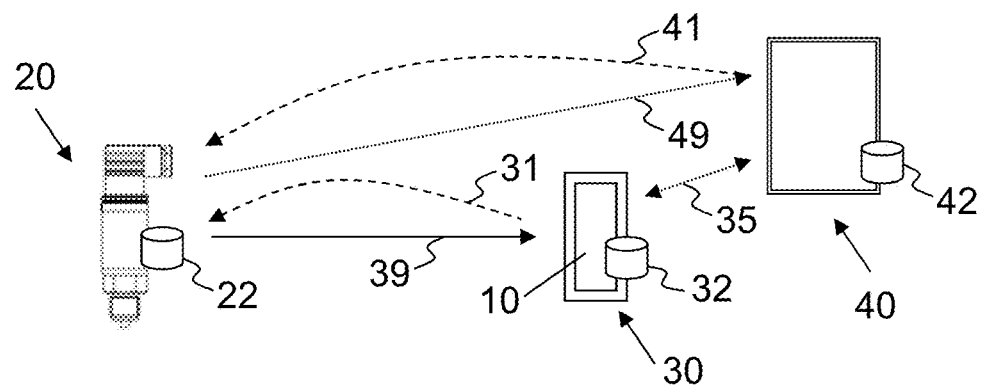
FIG. 2 schematically shows a scenario with a field device, a mobile device, and a server according to one embodiment.

FIG. 2 schematically shows a scenario with a field device 20, a mobile device 30 and a server 40 according to one embodiment. Other embodiments may have fewer or even more devices than shown in FIG. 2. In the embodiment shown, the field device 20 has a file 22, for example named "CI properties VEGA", in which CI properties for this Vega field device are stored. The operating program 10 may run on a mobile device 30. The mobile device 30 may have, for example, a file 32 with default values for the CI properties. When the operating program 10 is called, at least one generic property for graphical elements 15 (see FIG. 1) is assigned to a CI property. This can be implemented, for example, in such a way that when the operating program 10 is called, a connection is established with the field device 20 via a channel 31. If the connection between the operator program 10 and the field device 20 is successful, the field device 20 may send contents of the file 22 to the operator program 10 via a channel 39, and the operator program 10 may perform the assignment. If the assignment fails, then the operating program 10 may serve, for example, the file 32 for an assignment with default values. Alternatively or additionally, a (possibly further) operating program may run on a server 40, where default values are stored, for example, on a file 42. In one embodiment, the server 40 may be used to request or provide authorization via a channel 35. Each of the files 22, 32, and 42 shown may be organized into a plurality of individual files. The channels may be wireless channels, for example. Communication may alternatively or additionally be possible via wire-bound channels.

Figure 3:
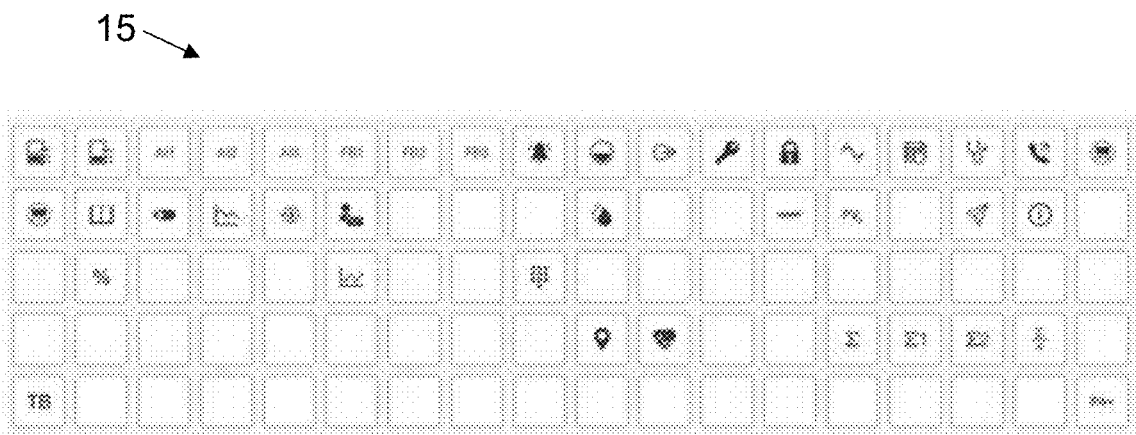
FIG. 3 shows a set of graphic elements according to one embodiment.

FIG. 3 shows a set of graphical elements 15 according to one embodiment. In this embodiment, the graphical elements 15 can be created based on a font file. After assignment, the graphic elements 15 can be used, for example, in any size and/or color—analogously to a font character—in the operating program or app.

Figure 4:
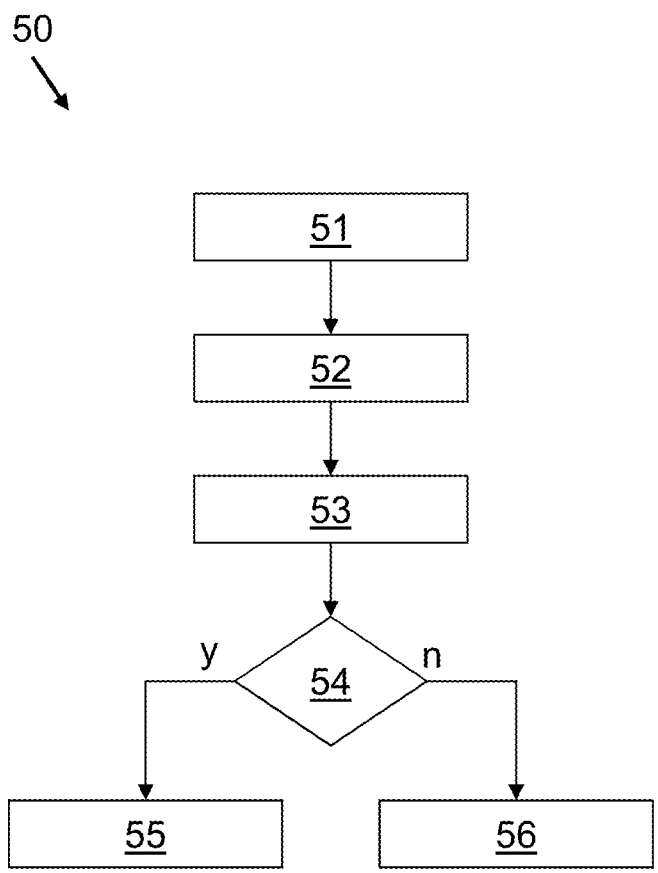
FIG. 4 shows a flowchart illustrating a method according to one embodiment.

FIG. 4 shows a flowchart 50 with a method according to one embodiment. In a step 51, the operating program or app 10 is started, e.g. on a mobile device. In a step 52, a connection is established with a field device. In a step 53, a CI property is requested, e.g., from the field device. In a step 54, it is queried whether the request was successful. This may include an authorization. If the request was successful, then a branch is made to a step 55 where the CI property is used. If the request was not successful, the system branches to a step 56 in which the CI property is replaced by default values, for example.

Figure 5:
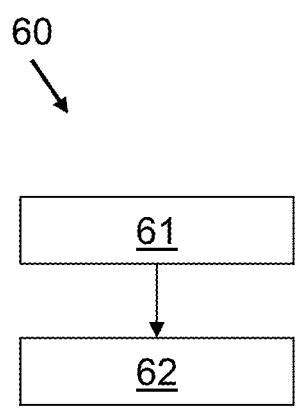
FIG. 5 shows a flowchart illustrating a method according to a further embodiment.

FIG. 5 shows a flowchart 60 with a method according to a further embodiment. In a step 61, at least one graphical element of a control program is created, the graphical element having at least one generic property. In a step 62, the operator program is invoked, wherein the at least one generic property of the graphical element is assigned to a CI property.

LIST OF REFERENCE NUMERALS 10 operator program, app
15 graphic element
20 field device
22 file on the field device
30 mobile device
31, 35, 39, 41, 49 channels
32 file on the mobile device
40 server
42 file on the server
50 flow diagram
51-56 steps
60 flow diagram
61, 62 steps

The invention claimed is:

1. A method of assigning a generic property of a graphical element of an operating program for a field device to at least one property of a corporate identity ("CI") property, the operating program being run on a mobile device, the method comprising:
creating at least one graphical element of the operating program, the graphical element having at least one generic property;
starting the operating program on the mobile device, wherein the at least one generic property of the graphical element is assigned to the CI property
establishing a connection with the field device;
requesting the CI property from the field device, including an authorization; and
when the request was successful, using the operator program with the CI property,
wherein the at least one generic property of the graphical element is replaced by the CI property.

2. The method according to claim 1,
wherein the CI property is assigned by way of a file on the field device.

3. The method according to claim 1,
wherein the CI property is assigned by means of a file on a server and/or by means of a file on a mobile device.

4. The method according to claim 1,
wherein the CI property is assigned from a combination of a first file on the field device and a second file on a server and/or a mobile device.

5. The method according to claim 1,
wherein the assigning of the CI property is performed by way of an authorized access to the field device, a server and/or a mobile device.

6. The method according to claim 1,
wherein the CI property includes multiple colors and/or one or more graphics.

7. The method according to claim 1,
wherein the CI property is variable.

8. The method according to claim 1,
wherein the CI property is stored as a property of a font.

9. The method according to claim 1, further comprising:
generating an operator program based on a generic operator program using at least one CI property.

10. A field device comprising:
circuitry configured to assign a generic property of a graphical element to a corporate identity ("CI") property, the graphical element being of an operating program for the field device and the operating program being run on a mobile device, the circuitry being further configured to create at least one graphical element of the operating program, the graphical element having at least one generic property;

start the operating program on the mobile device, wherein the at least one generic property of the graphical element is assigned to the CI property establish a connection with the field device;

request the CI property from the field device, including an authorization; and when the request is successful, use the operator program with the CI property, wherein the at least one generic property of the graphical element is replaced by the CI property.

11. A non-transitory computer-readable medium storing a program element for assigning a generic property of a graphical element of an operating program for a field device to at least one property of a corporate identity ("CI") property which, when executed by a processor of a field device, a server, and/or a mobile device, instructs the processor to be configured to create at least one graphical element of an operating program, the graphical element having at least one generic property, start the operating program, wherein the at least one generic property of the graphical element is assigned to the CI property;

establish a connection with the field device;

request the CI property from the field device, including an authorization; and when the request was successful, use the operator program with the CI property, wherein the at least one generic property of the graphical element is replaced by the CI property.

12. The non-transitory computer-readable medium of claim 11, wherein the CI property is assigned by way of a file on the field device.

13. The non-transitory computer-readable medium of claim 11, wherein the CI property is assigned by means of a file on a server and/or by way of a file on a mobile device.

14. The non-transitory computer-readable medium of claim 11, wherein the CI property is assigned from a combination of a first file on the field device and a second file on the server and/or the mobile device.

15. The non-transitory computer-readable medium of claim 11, wherein the assigning of the CI property is performed by means of an authorized access to the field device, the server and/or the mobile device.

16. The non-transitory computer-readable medium of claim 11, wherein the CI property includes multiple colors and/or one or more graphics.

17. The non-transitory computer-readable medium of claim 11, wherein the CI property is variable or is stored as a property of a font.

* * * * *